(12) United States Patent
Leis et al.

(10) Patent No.: US 12,309,214 B2
(45) Date of Patent: May 20, 2025

(54) APPARATUS, METHOD AND COMPUTER PROGRAM

(71) Applicant: NOKIA TECHNOLOGIES OY, Espoo (FI)

(72) Inventors: Peter Leis, Penzberg (DE); Lazaros Gkatzikis, Issy-les-Moulineaux (FR)

(73) Assignee: Nokia Technologies Oy, Espoo (FI)

( * ) Notice: Subject to any disclaimer, the term of this patent is extended or adjusted under 35 U.S.C. 154(b) by 334 days.

(21) Appl. No.: 17/797,349

(22) PCT Filed: Feb. 6, 2020

(86) PCT No.: PCT/EP2020/053037
§ 371 (c)(1),
(2) Date: Aug. 3, 2022

(87) PCT Pub. No.: WO2021/155937
PCT Pub. Date: Aug. 12, 2021

(65) Prior Publication Data
US 2023/0055014 A1 Feb. 23, 2023

(51) Int. Cl.
*H04B 7/00* (2006.01)
*H04L 65/1104* (2022.01)
(Continued)

(52) U.S. Cl.
CPC ...... *H04L 65/4061* (2013.01); *H04L 65/1104* (2022.05); *H04W 4/10* (2013.01); *H04W 4/16* (2013.01)

(58) Field of Classification Search
CPC .. H04L 65/4061; H04L 65/1104; H04W 4/10; H04W 4/12; H04W 4/14; H04W 4/16; H04W 28/0273
See application file for complete search history.

(56) References Cited

U.S. PATENT DOCUMENTS 7,965,707 B2 * 6/2011 Jones .............. H04L 67/306
709/227
2008/0229390 A1 9/2008 Holm et al.
(Continued)

FOREIGN PATENT DOCUMENTS

WO 2019/015382 A1 1/2019

OTHER PUBLICATIONS

International Search Report and Written Opinion dated Oct. 5, 2020 corresponding to International Patent Application No. PCT/EP2020/053037.

*Primary Examiner* — Tuan Pham
(74) *Attorney, Agent, or Firm* — Barta Jones, PLLC

(57) ABSTRACT

An apparatus comprising means for performing: receiving, from a first client, a call request comprising address information for calling at least one second client, the address information comprising a Functional Alias, wherein the Functional Alias is activated by the at least one second client; in response to receiving the call request at the apparatus, sending, to a server, a request to resolve the Functional Alias to at least one Mission Critical Push to Talk Identifier of the at least one second client that has activated the Functional Alias; receiving, at the apparatus from the server, the at least one Mission Critical Push to Talk Identifier of the at least one second client; sending, from the apparatus, a call request to the at least one second client using the at least one Mission Critical Push to Talk Identifier of the at least one second client.

15 Claims, 6 Drawing Sheets

(51) Int. Cl.
*H04L 65/4061* (2022.01)
*H04W 4/10* (2009.01)
*H04W 4/16* (2009.01)

(56) References Cited

U.S. PATENT DOCUMENTS

2013/0179335 A1* 7/2013 Raj ........................ G06Q 40/00
  705/39
2019/0028857 A1 1/2019 Pattan et al.
2020/0153838 A1* 5/2020 Ge ........................ H04L 67/306

* cited by examiner

APPARATUS, METHOD AND COMPUTER PROGRAM

FIELD

This disclosure relates to wireless communications. Some examples relate to call routing. Some examples relate to Future Railways Mobile Communication Systems (FRMCS).

BACKGROUND

In some wireless networks, for example in FRMCS networks, at least one Functional Alias (FA) can be used. An FA comprises an identity that can be used as an identifier for an assignment or task of a user.

STATEMENT OF INVENTION

According to a first aspect there is provided an apparatus comprising means for performing: receiving, from a first client, a call request comprising address information for calling at least one second client, the address information comprising a Functional Alias, wherein the Functional Alias is activated by the at least one second client; in response to receiving the call request at the apparatus, sending, to a server, a request to resolve the Functional Alias to at least one Mission Critical Push to Talk Identifier of the at least one second client that has activated the Functional Alias; receiving, at the apparatus from the server, the at least one Mission Critical Push to Talk Identifier of the at least one second client; sending, from the apparatus, a call request to the at least one second client using the at least one Mission Critical Push to Talk Identifier of the at least one second client.

According to some examples, the request to resolve the Functional Alias comprises a Session Initiation Protocol message comprising the Functional Alias; and the receiving, at the apparatus from the server, the at least one Mission Critical Push to Talk Identifier comprises: receiving a Session Initiation Protocol message comprising the at least one Mission Critical Push to Talk Identifier.

According to some examples, the request to resolve the Functional Alias comprises a database query; and wherein the database query comprises the Functional Alias as a query parameter.

According to some examples, wherein the means are further configured to perform: in response to receiving, at the apparatus from the server, two or more Mission Critical Push to Talk Identifiers of the at least one second client: determining, based on a policy, whether to: send a call request to each Mission Critical Push to Talk Identifier of the two or more Mission Critical Push to Talk Identifiers; or to select one Mission Critical Push to Talk Identifier of the two or more Mission Critical Push to Talk Identifiers to send the call request.

According to some examples, the means are further configured to perform: determining, based on the call request received from the first client, that routing of the incoming call request is to be based on the Functional Alias.

According to some examples, the means are further configured to perform: determining, based on the Functional Alias, to which server of two or more servers to send the request to resolve the Functional Alias.

According to some examples, the server comprises a Mission Critical Push to Talk server owning the Functional Alias.

According to some examples, the apparatus comprises a Mission Critical Push to Talk controlling or participating server.

According to some examples, the incoming call request comprises a SIP INVITE request.

According to some examples, the incoming call request is received from a MCPTT client.

According to some examples, the outgoing call request comprises a SIP INVITE request.

According to some examples, the outgoing call request is sent to a MCPTT client.

According to a second aspect there is provided an apparatus comprising at least one processor; and at least one memory including computer program code; the at least one memory and the computer program code configured to, with the at least one processor, cause the apparatus at least to perform: receiving, from a first client, a call request comprising address information for calling at least one second client, the address information comprising a Functional Alias, wherein the Functional Alias is activated by the at least one second client; in response to receiving the call request at the apparatus, sending, to a server, a request to resolve the Functional Alias to at least one Mission Critical Push to Talk Identifier of the at least one second client that has activated the Functional Alias; receiving, at the apparatus from the server, the at least one Mission Critical Push to Talk Identifier of the at least one second client; sending, from the apparatus, a call request to the at least one second client using the at least one Mission Critical Push to Talk Identifier of the at least one second client.

According to some examples, the request to resolve the Functional Alias comprises a Session Initiation Protocol message comprising the Functional Alias; and the receiving, at the apparatus from the server, the at least one Mission Critical Push to Talk Identifier comprises: receiving a Session Initiation Protocol message comprising the at least one Mission Critical Push to Talk Identifier.

According to some examples, the request to resolve the Functional Alias comprises a database query; and wherein the database query comprises the Functional Alias as a query parameter.

According to some examples, the at least one memory and the computer program code are configured to, with the at least one processor, cause the apparatus at least to perform: in response to receiving, at the apparatus from the server, two or more Mission Critical Push to Talk Identifiers of the at least one second client: determining, based on a policy, whether to: send a call request to each Mission Critical Push to Talk Identifier of the two or more Mission Critical Push to Talk Identifiers; or to select one Mission Critical Push to Talk Identifier of the two or more Mission Critical Push to Talk Identifiers to send the call request.

According to some examples, the at least one memory and the computer program code are configured to, with the at least one processor, cause the apparatus at least to perform: determining, based on the call request received from the first client, that routing of the incoming call request is to be based on the Functional Alias.

According to some examples, the at least one memory and the computer program code are configured to, with the at least one processor, cause the apparatus at least to perform: determining, based on the Functional Alias, to which server of two or more servers to send the request to resolve the Functional Alias.

According to some examples, the server comprises a Mission Critical Push to Talk server owning the Functional Alias.

According to some examples, the apparatus comprises a Mission Critical Push to Talk controlling or participating server.

According to some examples, the incoming call request comprises a SIP INVITE request.

According to some examples, the incoming call request is received from a MCPTT client.

According to some examples, the outgoing call request comprises a SIP INVITE request.

According to some examples, the outgoing call request is sent to a MCPTT client.

According to a third aspect there is provided an apparatus comprising: circuitry for receiving, from a first client, a call request comprising address information for calling at least one second client, the address information comprising a Functional Alias, wherein the Functional Alias is activated by the at least one second client; circuitry for, in response to receiving the call request at the apparatus, sending, to a server, a request to resolve the Functional Alias to at least one Mission Critical Push to Talk Identifier of the at least one second client that has activated the Functional Alias; circuitry for receiving, at the apparatus from the server, the at least one Mission Critical Push to Talk Identifier of the at least one second client; and circuitry for sending, from the apparatus, a call request to the at least one second client using the at least one Mission Critical Push to Talk Identifier of the at least one second client.

According to a fourth aspect there is provided a method comprising: a method comprising: receiving, from a first client, a call request comprising address information for calling at least one second client, the address information comprising a Functional Alias, wherein the Functional Alias is activated by the at least one second client; in response to receiving the call request, sending, to a server, a request to resolve the Functional Alias to at least one Mission Critical Push to Talk Identifier of the at least one second client that has activated the Functional Alias; receiving, from the server, the at least one Mission Critical Push to Talk Identifier of the at least one second client; and sending a call request to the at least one second client using the at least one Mission Critical Push to Talk Identifier of the at least one second client.

According to some examples, the request to resolve the Functional Alias comprises a Session Initiation Protocol message comprising the Functional Alias; and wherein the receiving, from the server, the at least one Mission Critical Push to Talk Identifier comprises: receiving a Session Initiation Protocol message comprising the at least one Mission Critical Push to Talk Identifier.

According to some examples, the request to resolve the Functional Alias comprises a database query; and wherein the database query comprises the Functional Alias as a query parameter.

According to some examples, the method comprises: in response to receiving, from the server, two or more Mission Critical Push to Talk Identifiers of the at least one second client: determining, based on a policy, whether to: send a call request to each Mission Critical Push to Talk Identifier of the two or more Mission Critical Push to Talk Identifiers; or to select one Mission Critical Push to Talk Identifier of the two or more Mission Critical Push to Talk Identifiers to send the call request.

According to some examples, the method comprises: determining, based on the call request received from the first client, that routing of the incoming call request is to be based on the Functional Alias.

According to some examples, the method comprises: determining, based on the Functional Alias, to which server of two or more servers to send the request to resolve the Functional Alias.

According to some examples, the server comprises a Mission Critical Push to Talk server owning the Functional Alias.

According to some examples, the method is performed by a Mission Critical Push to Talk controlling or participating server.

According to some examples, the incoming call request comprises a SIP INVITE request.

According to some examples, the incoming call request is received from a MCPTT client.

According to some examples, the outgoing call request comprises a SIP INVITE request.

According to some examples, the outgoing call request is sent to a MCPTT client.

According to a fifth aspect there is provided a computer program comprising instructions for causing an apparatus to perform at least the following: receiving, from a first client, a call request comprising address information for calling at least one second client, the address information comprising a Functional Alias, wherein the Functional Alias is activated by the at least one second client; in response to receiving the call request at the apparatus, sending, to a server, a request to resolve the Functional Alias to at least one Mission Critical Push to Talk Identifier of the at least one second client that has activated the Functional Alias; receiving, at the apparatus from the server, the at least one Mission Critical Push to Talk Identifier of the at least one second client; sending, from the apparatus, a call request to the at least one second client using the at least one Mission Critical Push to Talk Identifier of the at least one second client.

According to a sixth aspect there is provided a computer program comprising instructions stored thereon for performing at least the following: receiving, at an apparatus from a first client, a call request comprising address information for calling at least one second client, the address information comprising a Functional Alias, wherein the Functional Alias is activated by the at least one second client; in response to receiving the call request at the apparatus, sending, to a server, a request to resolve the Functional Alias to at least one Mission Critical Push to Talk Identifier of the at least one second client that has activated the Functional Alias; receiving, at the apparatus from the server, the at least one Mission Critical Push to Talk Identifier of the at least one second client; sending, from the apparatus, a call request to the at least one second client using the at least one Mission Critical Push to Talk Identifier of the at least one second client.

According to a seventh aspect there is provided a non-transitory computer readable medium comprising program instructions for causing an apparatus to perform at least the following: receiving, from a first client, a call request comprising address information for calling at least one second client, the address information comprising a Functional Alias, wherein the Functional Alias is activated by the at least one second client; in response to receiving the call request at the apparatus, sending, to a server, a request to resolve the Functional Alias to at least one Mission Critical Push to Talk Identifier of the at least one second client that has activated the Functional Alias; receiving, at the apparatus from the server, the at least one Mission Critical Push to Talk Identifier of the at least one second client; sending, from the apparatus, a call request to the at least one second client using the at least one Mission Critical Push to Talk Identifier of the at least one second client.

According to an eighth aspect there is provided a non-transitory computer readable medium comprising program instructions stored thereon for performing at least the following: receiving, at an apparatus from a first client, a call request comprising address information for calling at least one second client, the address information comprising a Functional Alias, wherein the Functional Alias is activated by the at least one second client; in response to receiving the call request at the apparatus, sending, to a server, a request to resolve the Functional Alias to at least one Mission Critical Push to Talk Identifier of the at least one second client that has activated the Functional Alias; receiving, at the apparatus from the server, the at least one Mission Critical Push to Talk Identifier of the at least one second client; sending, from the apparatus, a call request to the at least one second client using the at least one Mission Critical Push to Talk Identifier of the at least one second client.

BRIEF DESCRIPTION OF FIGURES

The invention will now be described in further detail, by way of example only, with reference to the following examples and accompanying drawings, in which.

DETAILED DESCRIPTION

The present disclosure relates to wireless communications. Some examples relate to call routing.

The 3$^{rd}$ Generation Partnership Project (3GPP) has developed standards for Mission Critical Push To Talk (MCPTT) using Mobile Communication Networks, e.g. Long Term Evolution (LTE)/Evolved Packet Core (EPC) since Rel-13 (Release 13).

The Mission Critical System used for MCPTT may be included in and adapted to run on certain networks, such as Fifth Generation (5G) networks; 3GPP Rel-15 (Release 15) networks; 3GPP Rel-16 (Release 16) networks; 3GPP Rel-17 (Release 17) networks; etc.

MCPTT communication is used for communications that if disrupted, would significantly impact how a system operates. An example of an MCPTT system is an emergency services communication system.

MCPTT communication can be used for Mission Critical communication and as such can be used for Public Safety communication. An example of an MCPTT communication system is a communication system for public authorities, e.g. Police.

Since Rel-15, 3GPP has started to develop Mobile Communication for Railways. The system developed for Mission Critical communication may be used as a basis for the future Railways communication system. This Railways communication system is expected to substitute the existing GSM-R network used to serve railways communication needs. The Mobile Communication System for Railways is expected to work on underlying LTE/EPC or 5G infrastructure.

In some examples, one or more FAs are used. FAs are used, for example, in Rel-15 for Mobile Communication System for Railways. An FA comprises an identity that can be used as an identifier for an assignment or task of a user. FAs can be managed by the user.

In some examples, an FA may be used as an identifier to address communication towards a called party. In such examples, procedures are used such that an FA is routable.

In MCPTT systems, an MCPTT server can be used to establish a connection among MCPTT clients in the system. The MCPTT server can also store addressing information of MCPTT clients and can be used to set up calls between MCPTT clients.

MCPTT clients can be used by users to connect to a MCPTT system. An MCPTT client may comprise: a user equipment (UE); an application operating at a UE; a user device; a computing device; etc.

Figure 1A:
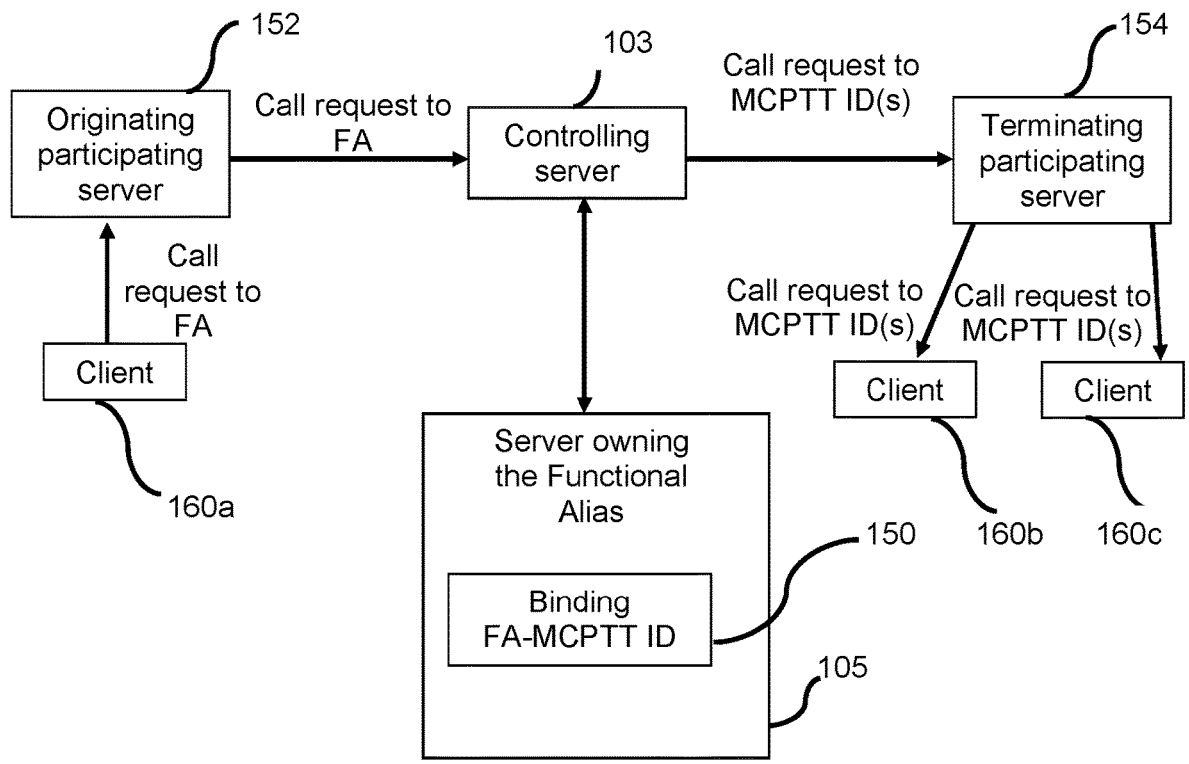
FIG. 1A shows a schematic representation of a network.

FIG. 1A shows an example of a MCPTT system. A client 160a served by an originating server 152, which is participating in MCPTT communication, sends to a controlling server in the MCPTT system (i.e. a controlling MCPTT server), a call request to a FA corresponding to one or more clients 160b, 160c at a terminating server 154 of the call. Server 154 is also participating in MCPTT. The call request may be a private call request, for example. In some examples, the call request may be an emergency call request, a MCPTT first-to-answer call request or a group-call request.

The MCPTT system requires a MCPTT-ID in order to identify the one or more called clients (users) 160b, 160c and to send the call request to the corresponding server 154. As discussed further below, the controlling server can retrieve one or more MCPTT IDs corresponding to the FA from server 105, which stores a FA-MCPTT ID mapping of FAs and MCPTT IDs in the system. Server 105 may be considered to be a Server owning the FAs. In some examples, there may be more than one server owning the FAs in the system.

In the MCPTT system of FIG. 1A, there is a functional split between server 103 and server 105. Server 103 controls calls in the MCPTT system, and server 105 stores mapping of FAs to MCPTT IDs at 150 in the system.

In MCPTT, clients (users) can be identified using an MCPTT identifier (ID). In situations where an FA is used as an identifier for one or more clients in addition to the MCPTT ID, a mapping between FA and MCPTT ID is available and held in a database. The database may comprise an MCPTT server. The database may comprise an "MCPTT Server Owning the FAs".

In situations where MCPTT IDs are used when a call is to be set up in MCPTT, the calling client 160a may contact a "MCPTT Controlling Server" and can include in the request the MCPTT ID of the called client. From the MCPTT ID, the MCPTT Controlling Server can identify the called client and set up the call.

In situations where FAs are used to set up a call in MCPTT, the calling client may include an FA instead of the MPCTT ID when requesting to set up a call. In this case, the Controlling Server may not know which users have activated the FA and consequently which MCPTT ID(s) relate to which FA. The Controlling Server therefore needs to retrieve a mapping of the requested FA(s) to MCPTT IDs.

Figure 1B:
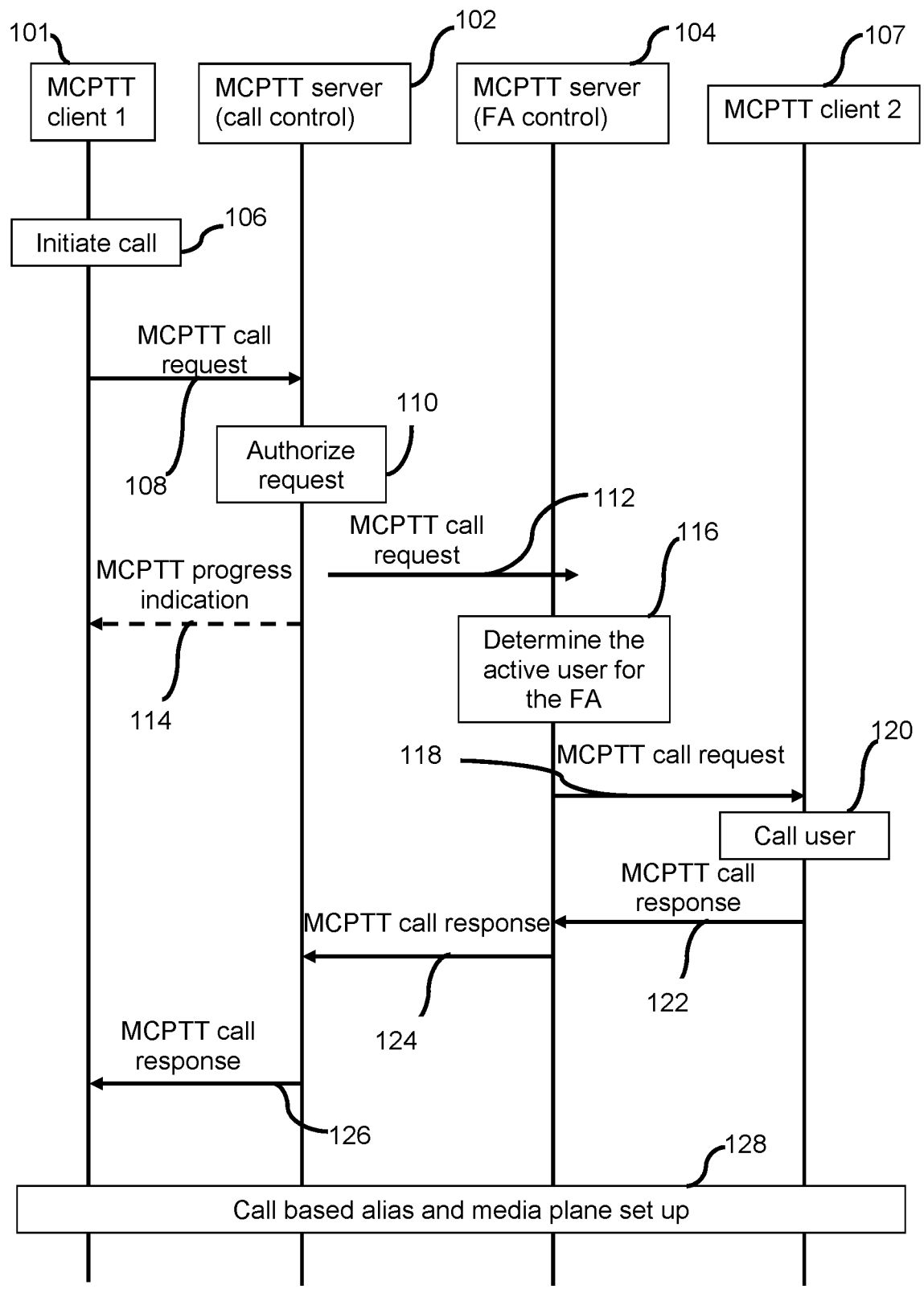
FIG. 1B shows a schematic representation of a message flow in a network.

An example message flow is shown in FIG. 1B.

In the example of FIG. 1B, an MCPTT user at MCPTT client 101 attempts to establish a call to MCPTT client 107 by calling an FA that has been activated by MCPTT client 107. At step 106, MCPTT client 101 may send, to MCPTT server 102, an MCPTT call request comprising the FA of MCPTT client 107 without the MCPTT ID of MCPTT client 107. MCPTT server 102 may be a controlling MCPTT server of the functional alias, and in some examples may be used for call control.

At step 108, the MCPTT client 101 sends an MCPTT call request towards the MCPTT server 108. The MCPTT call request comprises an FA corresponding to a user of MCPTT client 107 instead of an MCPTT ID of the invited user of MCPTT client 107 and, optionally, a FA of the calling user at MCPTT client 101.

At step 110, MCPTT server 102 checks whether the MCPTT user at MCPTT client 101 is authorized to initiate the call. In examples where an FA of the calling user at MCPTT client 101 is present in the request sent at 108, MCPTT server 102 can check whether the FA of the calling user can be used and whether the FA of the calling user has been activated for the user at MCPTT client 101.

At step 112, MCPTT server 102 sends an MCPTT call request to MCPTT server 104. The call request comprises an FA of the called MCPTT client 107. MCPTT server 104 may be used for FA control. MCPTT server 104 may comprise an MCPTT server owning the FAs.

At step 114, MCPTT server 102 may provide a progress indication to MCPTT client 101 to indicate progress in the call setup process.

At step 116, MCPTT server 104 resolves the FA of called MCPTT client 107 to determine a related MCPTT ID of MCPTT client 107 which has activated the called FA included in requests 108 and 112. In examples where multiple MCPTT users activate the same FA, the MCPTT server 104 can select one MCPTT user at MCPTT client 107 based on a policy. Examples of such policies may be based on, for example, the time sequence of activation, location, etc.

At step 118, MCPTT server 104 sends the MCPTT call request towards the MCPTT client 107. The call request sent at 118 may comprise at least one MCPTT ID of the called MCPTT client. In some examples, the call request sent at 118 may comprise at least one FA of the calling MCPTT user 101. In order to perform the function of 118, the MCPTT server 104 used for FA control needs to be able to route calls to clients, which is not usually part of the role of an FA controlling server. MCPTT server 104, which may comprise an MCPTT server owning the FAs, therefore needs to be provided with this additional functionality.

At step 120, the receiving MCPTT client 107 notifies the user about the incoming call and displays, to the user of MCPTT client 107, the FA of calling MCPTT user 101.

At step 122, the receiving MCPTT client 107 accepts the call. In some examples, the receiving MCPTT client 107 accepts the call automatically. The receiving MCPTT client 107 may accept the call by sending an MCPTT call response to MCPTT server 104.

The call routing performed by the MCPTT server 104 (i.e. the request and response sent at 118 and 122 respectively) causes additional overhead requirements for MCPTT server 107, and for the system comprising: MCPTT client 101; MCPTT server 102; MCPTT server 104; and MCPTT client 107 to fulfil.

At step 124, MCPTT server 104 forwards the MCPTT call response to MCPTT 102.

At step 126, after receiving the MCPTT call response from MCPTT server 104 accepting the call request, MCPTT server 102 informs MCPTT client 101 about successful call establishment.

At step 128, MCPTT client 101 and MCPTT client 107 have successfully established media plane for communication and either user can transmit media.

According to some examples, a Controlling Server sends a request (such as a database query or SIP message) to the Server owning the FAs on a call by call basis when the controlling server receives a request from a client to set up a call comprising an FA for a called client instead of an MCPTT ID for the called client. The request sent to the Server owning the FAs from the Controlling Server may comprise the FA. As a response, the Server Owning the FAs will send to the Controlling Server information on one or more MCPTT IDs for the respective FA. The Controlling Server can then setup the call.

Figure 2:
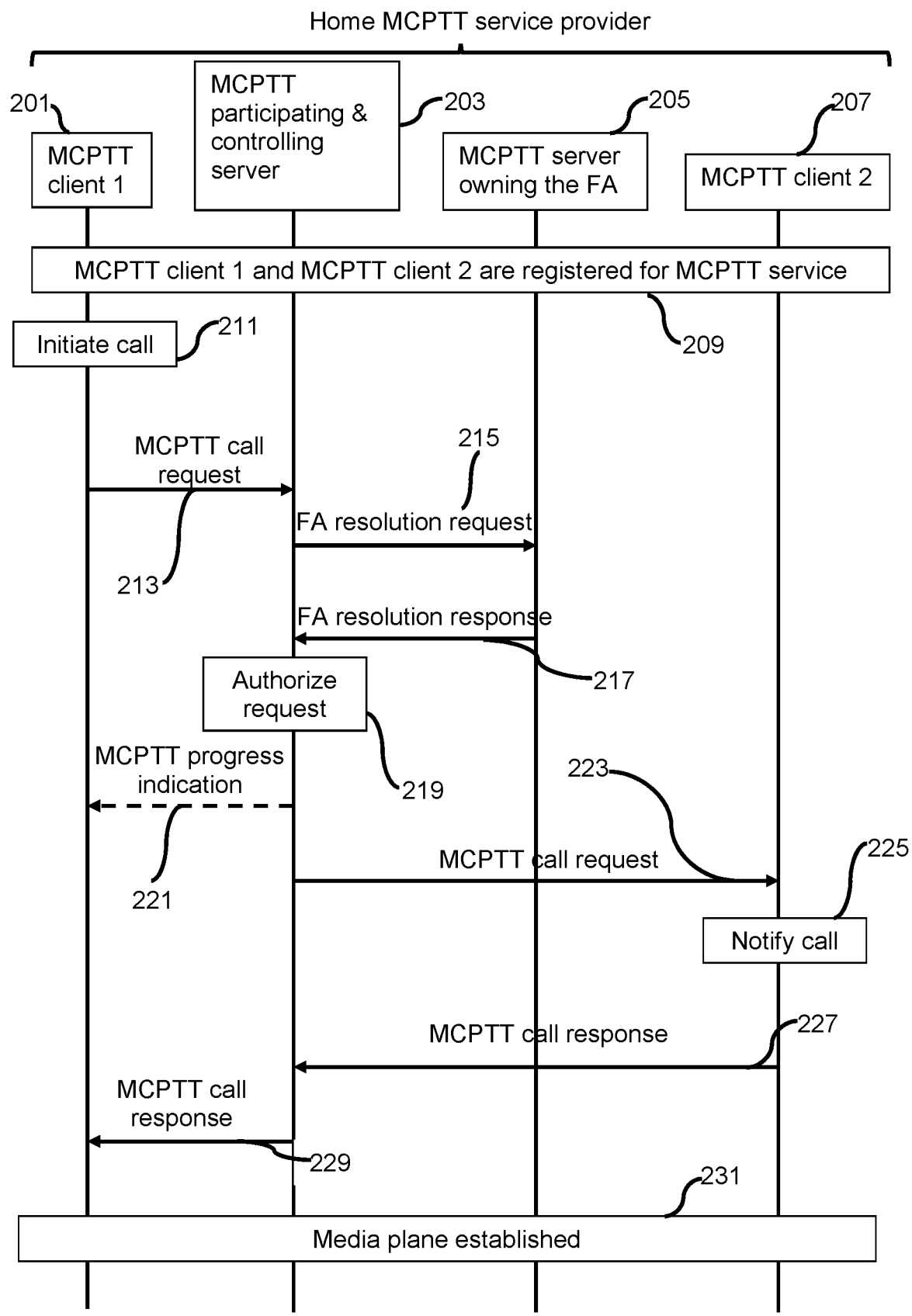
FIG. 2 shows a schematic representation of a message flow in a network.

An example message flow is shown in FIG. 2. At step 209, a first MCPTT client 201 and second MCPTT client 207 are registered for a MCPTT service. MCPTT client 201 may comprise, for example, at least one of: a User Equipment (UE), a user device; a mobile terminal. MCPTT client 207 may comprise, for example, at least one of: a UE, a user device; a mobile terminal.

At step 211, MCPTT client 201 initiates a call by sending a request to server 203. Server 203 may be participating in MCPTT and controlling the MCPTT transmissions. Server 203 may comprise a controlling MCPTT server. The request sent at 213 comprises a FA of the MCPTT client which MCPTT client 201 is attempting to call. In the example of the FIG. 2, the request sent at 213 comprises an FA activated by MCPTT client 207. The request sent at 213 may comprise a SIP invite request. The request sent at 213 may comprise a SIP invite request comprising the FA to be called.

Upon receipt of the request sent at 213, server 203 determines that routing of the request based on the received FA in the request sent at 213 is required. At 215, server 203 then send a request to server 205 to resolve the FA. Resolving an FA may comprise, in some examples, providing at least one identifier that can be used to contact a user who is using the FA. Resolving an FA may comprise, in some examples, proving at least one MCPTT ID that can be used to contact a user who is using the FA. Server 205 may comprise an MCPTT server owning the FAs.

At 217, server 205 responds by providing a response to the FA resolution request sent at 215. The response sent at 217 may comprise a resolved FA. The resolved FA may comprise at least one identifier that can be used to contact a user who is using the FA and, in some examples, at least one MCPTT ID can be used to contact a user who is using the FA.

In some examples, upon receiving the request sent at 213, server 203 contacts server 205 at 215 by forwarding a SIP INVITE request received at 213 to server 205. The SIP INVITE request may comprise the FA of MCPTT client 207.

In other examples, upon receiving the request sent at 213, server 203 contacts server 205 at 215 by using a database protocol. The FA of MCPTT client 207 can be used as a query parameter.

At 217, upon receipt of a SIP INVITE request or a database query, server 205 storing the FA to MCPTT ID mapping of MCPTT client 207 resolves the received FA with at MCPTT IDs of potential target MCPTT users. In some examples, where no user has activated the received FA, the received FA is not resolved to an MCPTT ID. Server 205 owning the FA can send back all MCPTT IDs related to (activated for) the received FA by sending, for example, a SIP response at 217 in examples where server 205 has received a SIP INVITE request at 215; or by sending, for example, a database query response which carries all MCPTT IDs related to the received FA in examples where server 205 has received a database query at 215.

In some examples, at 215 when server 205 receives the request from server 203, server 205 can modify the request to include the MCPTT ID. In some examples, the Request-Uniform Resource Indicator (R-URI) of the request sent at 215 is modified to comprise the MCPTT ID, and the modified request is then returned at 217. The modified request can then be sent at 223 as described below.

At 219, upon receipt of a response at 217, server 203 can use the received MCPTT IDs (related to the FA of MCPTT client 207) to build an outgoing request that uses the received MCPTT IDs as a target. The outgoing request may comprise a SIP INVITE request.

At 219, in cases where server 205 has received more than one MCPTT ID, then the server 205 can use an addressing policy to decide whether to send out one outgoing request per MCPTT ID or whether to choose one MCPTT ID and send one outgoing request.

At step 221, server 203 provides a progress indication to MCPTT client 201 to indicate progress in the call setup process.

At step 223, server 203 sends a MCPTT call request towards the MCPTT client 207. The call request sent at 223 may comprise at least one MCPTT ID of called MCPTT client 207. The call request sent at 223 may comprise at least one FA of the called MCPTT user 207.

In cases where more than one MCPTT ID is returned for the FA at step 217, which may happen in cases where more than one client has activated an FA, the call request sent at step 223 may comprise a group call request to more than one MCPTT client corresponding to each MCPTT ID returned for the FA at step 217.

In cases where, at step 213, as well as an FA of one or more MCPTT clients, one or more MCPTT IDs of other MCPTT clients to be called are included in the call request, the call request sent at step 223 may comprise a group call request to: the resolved MCPTT IDs corresponding to the FA of the one or more MCPTT clients; and the one or more MCPTT IDs of the other MCPTT clients to be called included in the request of step 213.

At step 225, the receiving MCPTT client 207 notifies the user about the incoming call and displays, to the user of MCPTT client 207, the FA of calling MCPTT user 201.

At step 227, the receiving MCPTT client 207 accepts the call. In some examples, the receiving MCPTT client 207 accepts the call automatically. The receiving MCPTT client 207 may accept the call by sending an MCPTT call response to server 203.

At step 229, after receiving the call response from MCPTT client 207 accepting the call request, server 203 informs MCPTT client 201 about successful call establishment.

At step 231, MCPTT client 201 and MCPTT client 207 have successfully established media plane for communication and either user can transmit media.

Server 203 may comprise a MCPTT controlling server. Server 205 may comprise an MCPTT server owning the FAs. Server 205 may store an FA to MCPTT ID mapping.

In the example of FIG. 2, server 203 is not required to subscribe to server 205 for activation/de-activation updates related to the called FA. Instead, server 203 retrieves the MCPTT IDs of the clients that have activated a called FA from the MCPTT server owning the FA (server 205).

The call requests shown in FIGS. 1A, 1B and 2 may, in some examples, comprise private calls. In some examples, the call requests shown in FIGS. 1A, 1B and 2 may be used for other types of call such as emergency calls, MCPTT first-to-answer calls and group-calls.

By resolving an FA only when an FA is called, a scenario where a mapping of FAs to MCPTT IDs has to be stored at server 203 is avoided. Further, a scenario where a mapping of FAs to MCPTT IDs has to be updated at server 203 for FAs that are not called using server 203 is avoided. The method also avoids scenarios where data inconsistencies between data stored at server 203 and server 205, by avoiding full lists of MCPTT ID and FA mappings having to be stored at both servers 203 and 205.

Figure 3:
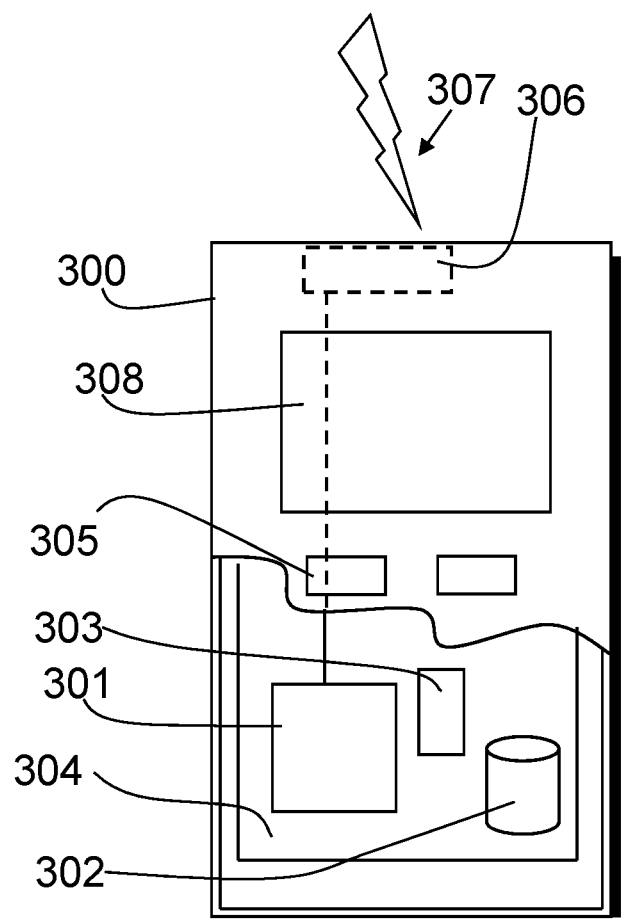
FIG. 3 shows schematic representation of an apparatus according to an example.

A possible wireless communication device will now be described in more detail with reference to FIG. 3 showing a schematic, partially sectioned view of a communication device 300. Such a communication device is often referred to as user equipment (UE) or terminal. An appropriate mobile communication device may be provided by any device capable of sending and receiving radio signals. Non-limiting examples comprise a mobile station (MS) or mobile device such as a mobile phone or what is known as a 'smart phone', a computer provided with a wireless interface card or other wireless interface facility (e.g., USB dongle), personal data assistant (PDA) or a tablet provided with wireless communication capabilities, or any combinations of these or the like. A mobile communication device may provide, for example, communication of data for carrying communications such as voice, electronic mail (email), text message, multimedia and so on. Users may thus be offered and provided numerous services via their communication devices. Non-limiting examples of these services comprise two-way or multi-way calls, data communication or multimedia services or simply an access to a data communications network system, such as the Internet. Users may also be provided broadcast or multicast data. Non-limiting examples of the content comprise downloads, television and radio programs, videos, advertisements, various alerts and other information.

A wireless communication device may be for example a mobile device, that is, a device not fixed to a particular location, or it may be a stationary device. The wireless device may need human interaction for communication, or may not need human interaction for communication. In the present teachings the terms UE or "user" are used to refer to any type of wireless communication device.

The wireless device 300 may receive signals over an air or radio interface 307 via appropriate apparatus for receiving and may transmit signals via appropriate apparatus for transmitting radio signals. In FIG. 3 transceiver apparatus is designated schematically by block 306. The transceiver apparatus 306 may be provided for example by means of a radio part and associated antenna arrangement. The antenna arrangement may be arranged internally or externally to the wireless device.

A wireless device is typically provided with at least one data processing entity 301, at least one memory 302 and other possible components 303 for use in software and hardware aided execution of tasks it is designed to perform, including control of access to and communications with access systems and other communication devices. The data processing, storage and other relevant control apparatus can be provided on an appropriate circuit board and/or in chipsets. This feature is denoted by reference 304. The user may control the operation of the wireless device by means of a suitable user interface such as key pad 305, voice commands, touch sensitive screen or pad, combinations thereof or the like. A display 308, a speaker and a microphone can be also provided. Furthermore, a wireless communication device may comprise appropriate connectors (either wired or wireless) to other devices and/or for connecting external accessories, for example hands-free equipment, thereto. The communication devices 302, 304, 305 may access the communication system based on various access techniques.

Figure 4:
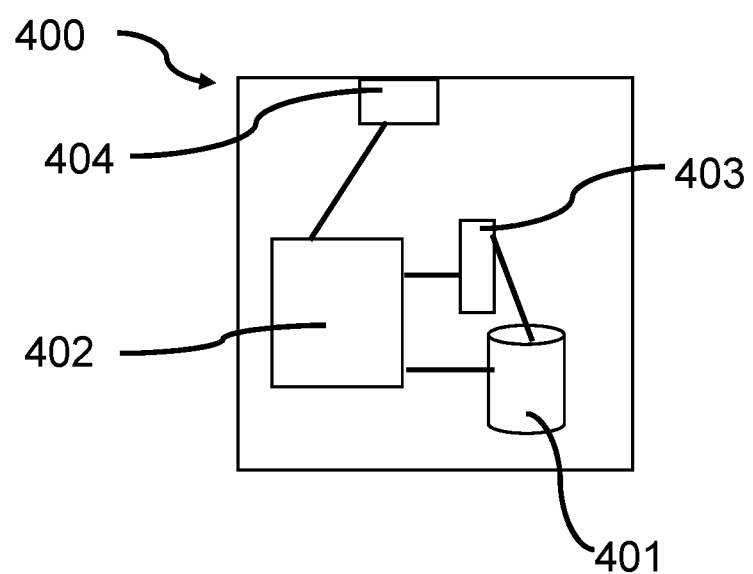
FIG. 4 shows schematic representation of an apparatus according to an example.

FIG. 4 shows an example of a control apparatus for a communication system, for example to be coupled to and/or for controlling a station of an access system, such as a RAN node, e.g. a base station, gNB, a central unit of a cloud architecture or a node of a core network such as an MME or S-GW, a scheduling entity such as a spectrum management entity, or a server or host, or an IAB or relay node. The control apparatus may be integrated with or external to a node or module of a core network or RAN. In some embodiments, base stations comprise a separate control apparatus unit or module. In other embodiments, the control apparatus can be another network element such as a radio network controller or a spectrum controller. In some embodiments, each base station may have such a control apparatus as well as a control apparatus being provided in a radio network controller. The control apparatus 400 can be arranged to provide control on communications in the service area of the system. The control apparatus 400 comprises at least one memory 401, at least one data processing unit 402, 403 and an input/output interface 404. Via the interface the control apparatus can be coupled to a receiver and a transmitter of the base station. The receiver and/or the transmitter may be implemented as a radio front end or a remote radio head. For example, the control apparatus 400 or processor 401 can be configured to execute an appropriate software code to provide the control functions.

Figure 5:
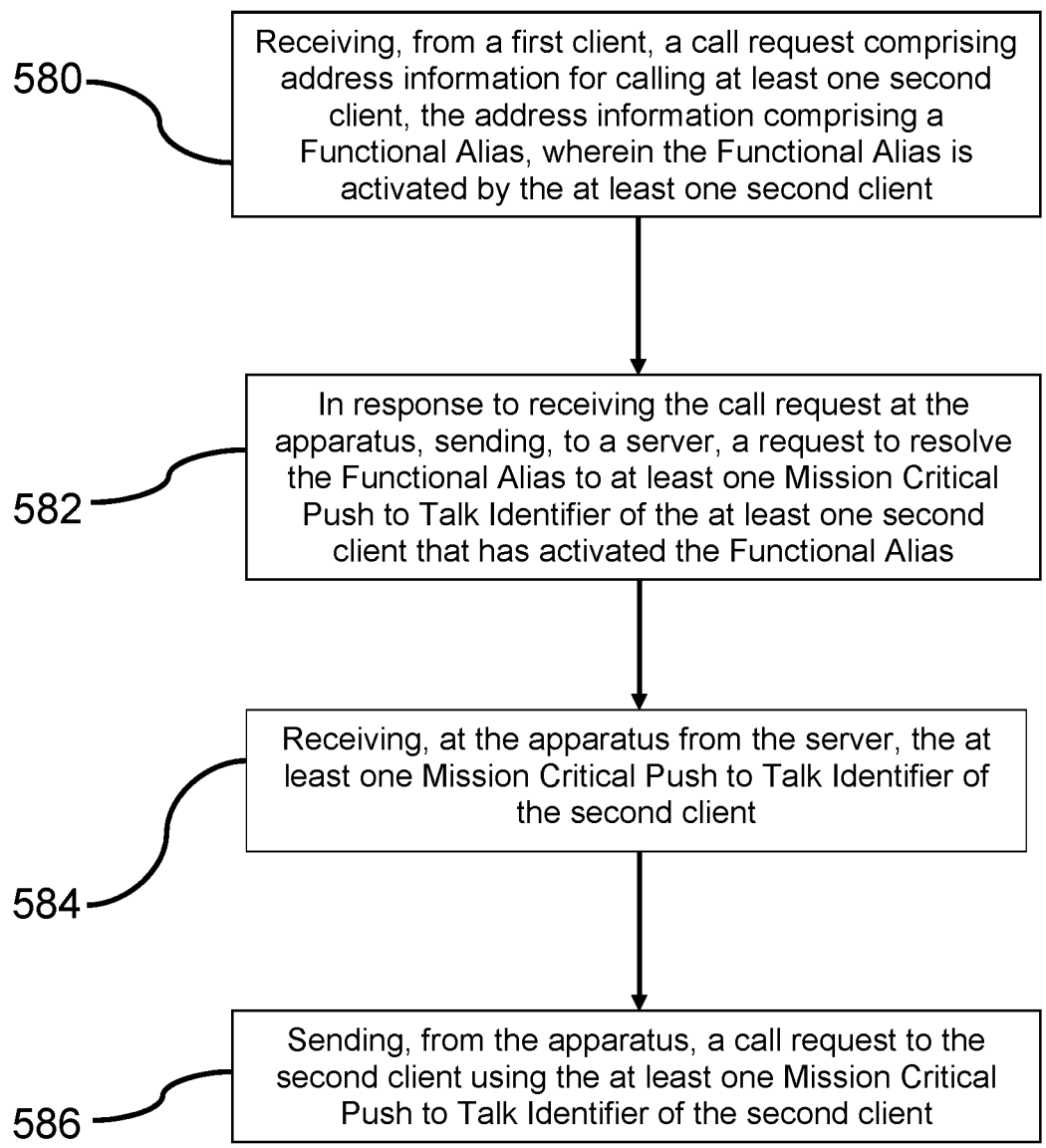
FIG. 5 shows a flow chart of a method.

FIG. 5 is a flow chart of a method according to an example. The flow chart of FIG. 5 is viewed from the perspective of an apparatus such as server 203. The method of FIG. 5 may be carried out by an MCPTT participating or controlling server.

At 580, the method of FIG. 5 comprises receiving, from a first client, a call request comprising address information for calling at least one second client. The address information may comprise a Functional Alias. The Functional Alias in the address information may be activated by the at least one second client.

At 582, the method of FIG. 5 comprises, in response to receiving the call request at the apparatus at step 580, sending, to a server, a request to resolve the Functional Alias. The request to resolve the Functional Alias may be a request to return, to the apparatus, at least one Mission Critical Push to Talk Identifier of the at least one second client that has activated the Functional Alias.

At 584, the method comprises receiving, the apparatus from the server, the at least one Mission Critical Push to Talk Identifier of the second client.

At 596, the method comprises sending, from the apparatus, a call request to the second client using the at least one Mission Critical Push to Talk Identifier of the second client.

It will be understood that the described steps of the methods above are not necessarily purely sequential, according to some examples. For example, FIG. 2, in terms of timings there may be overlap between some of the steps.

In general, the various embodiments may be implemented in hardware or special purpose circuits, software, logic or any combination thereof. Some aspects of the invention may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

As used in this application, the term "circuitry" may refer to one or more or all of the following: (a) hardware-only circuit implementations (such as implementations in only analog and/or digital circuitry) and (b) combinations of hardware circuits and software, such as (as applicable): (i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation. This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

The embodiments of this invention may be implemented by computer software executable by a data processor of the mobile device, such as in the processor entity, or by hardware, or by a combination of software and hardware. Computer software or program, also called program product, including software routines, applets and/or macros, may be stored in any apparatus-readable data storage medium and they comprise program instructions to perform particular tasks. A computer program product may comprise one or more computer-executable components which, when the program is run, are configured to carry out embodiments. The one or more computer-executable components may be at least one software code or portions of it.

Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD. The physical media is a non-transitory media.

The memory may be of any type suitable to the local technical environment and may be implemented using any suitable data storage technology, such as semiconductor based memory devices, magnetic memory devices and systems, optical memory devices and systems, fixed memory and removable memory. The data processors may be of any type suitable to the local technical environment, and may comprise one or more of general purpose computers, special purpose computers, microprocessors, digital signal processors (DSPs), application specific integrated circuits (ASIC), FPGA, gate level circuits and processors based on multi core processor architecture, as non-limiting examples.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

The foregoing description has provided by way of non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention as defined in the appended claims. Indeed there is a further embodiment comprising a combination of one or more embodiments with any of the other embodiments previously discussed.

What is claimed is:

1. An apparatus, comprising:
    at least one processor; and
    at least one memory storing instructions that, when executed by the at least one processor, cause the apparatus at least to:
    receive, from a first client, a call request comprising address information for calling at least one second client, the address information being a Functional Alias, wherein the Functional Alias is activated by the at least one second client;
    in response to receiving the call request at the apparatus, send, to a server, a request to resolve the Functional Alias to at least one Mission Critical Push to Talk Identifier of the at least one second client that has activated the Functional Alias;
    receive, at the apparatus from the server, the at least one Mission Critical Push to Talk Identifier of the at least one second client;
    receive, at the apparatus from the server, two or more Mission Critical Push to Talk Identifiers of the at least one second client;
    in response to receiving the two or more Mission Critical Push to Talk Identifiers of the at least one second client, determine, based on a policy, whether to: send a call request to each Mission Critical Push to Talk Identifier of the two or more Mission Critical Push to Talk Identifiers; or select one Mission Critical Push to Talk Identifier of the two or more Mission Critical Push to Talk Identifiers to send the call request; and
    based on the determining, send, from the apparatus, the call request to the at least one second client.

2. The apparatus as claimed in claim 1, wherein the request to resolve the Functional Alias comprises a Session Initiation Protocol message comprising the Functional Alias; and wherein the receiving, at the apparatus from the server, the at least one Mission Critical Push to Talk Identifier comprises receiving a Session Initiation Protocol message comprising the at least one Mission Critical Push to Talk Identifier.

3. The apparatus as claimed in claim 1, wherein the request to resolve the Functional Alias comprises a database query; and wherein the database query comprises the Functional Alias as a query parameter.

4. The apparatus as claimed in claim 1, wherein the instructions are further configured to, when executed by the at least one processor, cause the apparatus to at least:
    determine, based on the call request received from the first client, that routing of the incoming call request is to be based on the Functional Alias.

5. The apparatus as claimed in claim 1, wherein the instructions are further configured to, when executed by the at least one processor, cause the apparatus at least to:
    determine, based on the Functional Alias, to which server of two or more servers to send the request to resolve the Functional Alias.

6. The apparatus as claimed in claim 1, wherein the apparatus comprises a Mission Critical Push to Talk controlling or participating server.

7. The apparatus as claimed in claim 1, wherein the sending, to the server and in response to receiving the call request at the apparatus, the request to resolve the Functional Alias to the at least one Mission Critical Push to Talk Identifier of the at least one second client that has activated the Functional Alias is performed on a call by call basis.

8. A method, comprising:
    receiving, from a first client, a call request comprising address information for calling at least one second client, the address information being a Functional Alias, wherein the Functional Alias is activated by the at least one second client;
    in response to receiving the call request, sending, to a server, a request to resolve the Functional Alias to at least one Mission Critical Push to Talk Identifier of the at least one second client that has activated the Functional Alias;
    receiving, from the server, the at least one Mission Critical Push to Talk Identifier of the at least one second client;
    receiving, from the server, two or more Mission Critical Push to Talk Identifiers of the at least one second client;
    in response to receiving the two or more Mission Critical Push to Talk Identifiers of the at least one second client:
        determining, based on a policy, whether to send a call request to each Mission Critical Push to Talk Identifier of the two or more Mission Critical Push to Talk Identifiers, or to select one Mission Critical Push to Talk Identifier of the two or more Mission Critical Push to Talk Identifiers to send the call request; and
    based on the determining, sending the call request to the second client using the at least one Mission Critical Push to Talk Identifier of the at least one second client.

9. The method as claimed in claim 8, wherein the request to resolve the Functional Alias comprises a Session Initiation Protocol message comprising the Functional Alias;
    and wherein the receiving, from the server, the at least one Mission Critical Push to Talk Identifier comprises receiving a Session Initiation Protocol message comprising the at least one Mission Critical Push to Talk Identifier.

10. The method as claimed in claim 8, wherein the request to resolve the Functional Alias comprises a database query; and wherein the database query comprises the Functional Alias as a query parameter.

11. The method as claimed in claim 8, wherein the method further comprises:
    determining, based on the call request received from the first client, that routing of the incoming call request is to be based on the Functional Alias.

12. The method as claimed in claim 8, wherein the method further comprises:
   determining, based on the Functional Alias, to which server of two or more servers to send the request to resolve the Functional Alias.

13. The method as claimed in claim 8, wherein the method is performed by a Mission Critical Push to Talk controlling or participating server.

14. The method as claimed in claim 8, wherein the sending, to the server and in response to receiving the call request, the request to resolve the Functional Alias to the at least one Mission Critical Push to Talk Identifier of the at least one second client that has activated the Functional Alias is performed on a call by call basis.

15. A non-transitory computer readable medium comprising program instructions that, when executed by an apparatus, cause the apparatus to perform at least:
   receiving, from a first client, a call request comprising address information for calling at least one second client, the address information being a Functional Alias, wherein the Functional Alias is activated by the at least one second client;
   in response to receiving the call request at the apparatus, sending, to a server, a request to resolve the Functional Alias to at least one Mission Critical Push to Talk Identifier of the at least one second client that has activated the Functional Alias;
   receiving, at the apparatus from the server, the at least one Mission Critical Push to Talk Identifier of the at least one second client;
   receiving, from the server, two or more Mission Critical Push to Talk Identifiers of the at least one second client;
   in response to receiving the two or more Mission Critical Push to Talk Identifiers of the at least one second client, determine, based on a policy, whether to: send a call request to each Mission Critical Push to Talk Identifier of the two or more Mission Critical Push to Talk Identifiers; or to select one Mission Critical Push to Talk Identifier of the two or more Mission Critical Push to Talk Identifiers to send the call request; and
   based on the determining, sending, from the apparatus, the call request to the at least one second client using the at least one Mission Critical Push to Talk Identifier of the at least one second client.

\* \* \* \* \*